United States Patent [19]

Harrison et al.

[11] Patent Number: 5,071,891

[45] Date of Patent: Dec. 10, 1991

[54] FILLERS

[75] Inventors: David L. Harrison, Hartford; Louis P. Bates, Cuddington, both of England

[73] Assignee: Imperial Chemical Industrial PLC, London, England

[21] Appl. No.: 548,365

[22] Filed: Jul. 5, 1990

Related U.S. Application Data

[62] Division of Ser. No. 341,227, Apr. 21, 1989, abandoned, which is a division of Ser. No. 187,025, Apr. 27, 1988.

[30] Foreign Application Priority Data

Apr. 29, 1987 [GB] United Kingdom ................. 8710107

[51] Int. Cl.$^5$ ............................................... C08K 9/04
[52] U.S. Cl. ................................. 523/209; 523/200; 523/215; 523/216; 523/217
[58] Field of Search ............... 523/200, 215, 216, 217, 523/209

[56] References Cited

U.S. PATENT DOCUMENTS

| | | | |
|---|---|---|---|
| 3,956,230 | 5/1976 | Gaylord | 523/209 |
| 4,210,572 | 7/1980 | Herman et al. | 523/200 |
| 4,501,795 | 2/1985 | Takeuchi et al. | 428/4.7 |
| 4,690,749 | 9/1987 | Van Alstine et al. | 428/407 |
| 4,715,986 | 12/1987 | Graning et al. | 428/407 |

*Primary Examiner*—Paul R. Michl
*Assistant Examiner*—Yong S. Lee
*Attorney, Agent, or Firm*—Cushman, Darby & Cushman

[57] ABSTRACT

A coating composition for a particulate filler comprising an organic oligomer containing a plurality of oxy groups, less than 15% of which are comprised in hydroxy groups, organic oligomer components thereof, fillers coated with the coating compositions, organic polymer matrices filled with a dispersion of the coated filler, and processes for the preparation of the oligomer components, the coating compositions, the coated fillers and the filled matrices, and precursors of the coating compositions.

13 Claims, No Drawings

FILLERS

This is a division of application Ser. No. 07/341,227, filed Apr. 21, 1989, now abandoned, which is a division of application Ser. No. 07/187,025, filed Apr. 27, 1988.

This invention relates to filler coating compositions, organic oligomer components thereof, fillers coated with the coating composition, organic polymer matrices filled with a dispersion of the coated filler, and to processes for the preparation of the oligomer components, the coating compositions, the coated fillers and the filled matrices, and precursors of the coating compositions.

It is known to modify the properties of a variety of organic polymers by incorporating into such polymers one or more inorganic materials in finely divided form. These inorganic materials, commonly known as fillers, are generally less expensive than organic polymers and they may serve to increase the bulk of the resultant polymer and so permit a polymer to be used more economically, and to adjust and/or enhance at least some of the physical properties of the polymer, for example the slump resistance and extrudability of fluid polymers (e.g. sealants) and the tensile modulus, tensile strength, tear strength or resistance to wear of polymers in general, including cured sealants.

It is desirable to make such fillers as compatible as possible with organic polymers. It is thus also known to enhance some of the interactive physical properties between a filler and the polymer matrix in which it is used (e.g. the dispersibility of the filler in the matrix) by coating the filler with a coating composition based on an organic polymer. However, many such coated fillers are of low versatility, in contrast to those now provided by the present invention.

Accordingly, in a first aspect, the present invention provides a coating composition for a particulate filler comprising an organic oligomer containing a plurality of oxy groups, less than 15% of which are comprised in hydroxy groups.

We have found that a higher proportion of hydroxylic oxy groups may interact adversely with the cure system of some of the matrix polymers in which the coated fillers may be used, thereby tending to reduce the filler versatility.

In preferred oligomers of this type, essentially none of the oxy groups are in hydroxyl groups.

In a second aspect the present invention provides the foregoing oligomer components of the coating composition.

In a third aspect the present invention provides a process for the preparation of a coating oligomer of the present invention which comprises capping the hydroxyl groups in an organic oligomer containing at least one hydroxyl group and a plurality of non-hydroxylic oxy groups per molecule, such that less than 15% of the oxy groups in the product are in hydroxyl groups.

In a fourth aspect the present invention provides a particulate filler coated at least in part with a coating composition of the first aspect of present invention.

In a fifth aspect the present invention provides a process for the preparation of a coated particulate filler which process comprises intimately mixing a filler with (a) a coating composition of the present invention, or (b) a precursor of the coating composition of the present invention which comprises a hydroxylic precursor of the coating oligomer of the present invention, and thereafter sufficient of a capping agent for capping the hydroxyl groups in said hydroxylic precursor to give a coating oligomer of the second aspect of the present invention within the filler coating.

In a sixth aspect the invention provides a filled cohesive polymer matrix composition comprising a matrix organic polymer nd a coated filler of the invention.

In a seventh aspect the present invention provides a process for the production of a cohesive filled polymer matrix composition which process comprises intimately mixing the matrix polymer or a precursor thereof with a coated filler of the present invention, and thereafter as necessary converting the mixture to a filled polymer matrix composition.

In an eighth aspect, the present invention also provides an alternative process for the production of a filled cohesive polymer matrix composition which process comprises intimately mixing the matrix polymer or a precursor thereof with a filler and a coating composition of the present invention, and thereafter as necessary converting the mixture to a filled polymer matrix composition.

In a ninth aspect the present invention provides the use of a coating composition of the first aspect of the present invention as a dispersant for a filler in an organic polymer matrix or a precursor thereof.

In a tenth aspect the present invention provides a coating composition which is a precursor of that of the first aspect of the present invention and which comprises a precursor of the coating oligomer of the second aspect of the present invention.

Within the scope of the term "oligomer" in the foregoing expressions are included homo- and co-oligomers and -oligocondensates and mixtures thereof. The molecular weight of the oligomer may be as low as 200 or lower. The number of the repeat units may be sufficiently low that the polymer is a non-particulate fluid, such as a liquid at ambient temperatures; however, typically many of the oligomers are higher molecular weight materials used in finely divided solid form.

Within the oligomers of the second aspect of the present invention, suitable oligomer backbones include poly(alkylene oxides), polyalka(polyene oxides) and poly(arylene oxides); polyalkoxylated alcohols and polyols, poly(alkapolyoxy)lated alcohols and polyols, polyalkoxylated hydroxyarenes and polyhydroxyarenes, and poly(alkapolyoxy)lated hydroxyarenes and polyhydroxyarenes. Examples of these include alkylene oxide and alkadiene dioxide homo- and co- oligomers, in particular ethylene oxide - propylene oxide block co-oligomers; polyethoxylated or polypropoxylated phenols and polyphenols, especially polyethoxylated $C_{1-6}$ alkyl-substituted phenols, for example those having a means of 2 to 12, in particular 2 to 4 alkoxy groups per molecule; and polyethoxylated or propoxylated $C_{6-26}$ alcohols, in particular $C_{10-20}$ fatty alcohols.

Polyalkylene oxides, and polyalkoxylated alcohols and hydroxyarenes are preferred oligomers of the second aspect of the present invention, and are, for example, derivable by the reaction of alkylene oxides with themselves, and with alcohols or hydroxyarenes respectively. Oligomers derived in this manner have terminal hydroxyl groups, with the potential disadvantages referred to above.

Similarly produced derivates of alka(polyene oxides) and of polyols and polyhydroxyarenes with alkylene oxides may have non-terminal hydroxy functions or hydroxy functions from the polyol or polyhydroxyarene moiety.

85% or more of the oxy functions in the present oligomers should be non-hydroxylic; for example, in the above reaction products the hydroxyl groups may be capped, with sufficient of a capping agent to achieve this percentage. Generally at least 50% of the above hydroxyl groups should be capped, subject to the further condition that the product must contain no more than 15% of its oxy groups in free hydroxyl functions.

Any moiety (other than H) bound to a terminal oxygen atom amongst the plurality of oxy groups in the present coating oligomer (e.g. terminal in a chain of the oligomer) is referred to herein as a 'capping group', and the corresponding moiety comprising the —O— group as a 'capped group'. Any moiety which gives rise to a capped group which is inert to conventional matrix polymer cure systems may be used as a capping group, provided that the resultant capped oligomer is compatible with any intended matrix polymer for a corresponding coated filler. Favored capping groups also include groups containing a silicon atom directly or indirectly bonded to the —O— atom (favorably directly bonded). Within such groups, condensable silicon-containing groups are of interest. Favored capping groups also include groups containing a substituted carbamyl moiety directly bonded to the —O— atom, for example an arylaminocarbonyl group. Other favored capping groups include hydrocarbyl such as $C_{1-4}$ alkyl, e.g. methyl, optionally substituted by inert substituent as described above.

Within the scope of the term "condensable silicon-containing group" are included all groups containing moieties (directly or indirectly bonded to a silicon atom) which are capable of reaction and elimination in a condensation reaction under non-extreme conditions. For capping the hydroxyl groups in a precursor of a coating oligomer of the present invention, it may suitably be a group —SiXYZ where one of X, Y and Z is OR (where R is an optionally substituted hydrocarbyl group), and the other two are each independently OH, OR, R or a bond to the rest of the oligomer. Favored such groups include those which contain at least two OR group as defined. R is preferably optionally oxa-substituted $C_{1-6}$ alkyl. It is preferred that nay other R substituents are neither acidic nor basic. The organic oligomer component of the present coating composition may contain more than one type of such group containing silicon.

Examples of such groups are included in the following, which are attached directly to the —O— group.

$(R_1)(R_2)(R_3)Si$—A—
$(R_1)(R_2)R_4Si$—A—
$(R_1)R_5R_6Si$—A— wherein $R_1$ to $R_6$ are each independently optionally oxa-substituted $C_{1-6}$ alkyl or alkenyl, such as methyl, ethyl or vinyl and A is a bond or $C_{2-10}$ alkyl, such as ethyl, preferably a bond. Particular groups include methyldimethoxy- or methyldiethoxysilyl and vinyldimethoxy- or vinyldiethoxy-silyl.

It appears desirable that the mean concentration of oxy groups (some of which may be in capped groups) and/or capping groups (for example condensable silicon-containing groups) per coating oligomer molecular weight is sufficiently low that the oligomer is readily handled in its production and use, e.g. it is a solid readily soluble in conventional solvents or a liquid preferably readily miscible with the same. Within this constraint it appears desirable that the mean concentration of such groups is maximized.

A favored concentration of oxy groups is at least one such group per 40 to 80 total oligomer molecular weight (subject to the above constraint), e.g. 2 to 12 per molecule.

The coating oligomer is favorably one with a number average molecular weight in the range 100 to 750, preferably in the range 200 to 500, the molecular weight desirably being sufficiently low that the oligomer is readily handled as above.

The present coating oligomers (and fillers coated with them or compositions containing them) are believed to be compatible with most conventional matrix polymers including polycondensates (as may readily be ascertained in specific cases by routine trial and error). One of the main uses of the present coating oligomers is to enhance the dispersibility of fillers in, and the rheology of, fluid sealants and to adjust the tensile modulus of the cured products of such sealants. In such cases a strong (e.g. chemical) bond between filler and coating and/or coating and filler may not be desirable, for example it may undesirably stiffen the filled matrix.

However, use of the present coating oligomers in solid matrices is in no way excluded, and in such cases strong filler-coating and/or coating-matrix bonding may well be desirable. Additionally, even in initially fluid sealants, it may be desirable for longer term curing of the sealant to proceed at least in part by the formation of such bonds.

Again, in all the foregoing systems coating cross-linking may be desirable.

The present coating oligomers (and hence coating compositions comprising them, and particulate fillers coated at least in part with such compositions) appear to be versatile under all the above conditions. For example, they all appear compatible with matrix polymers or their precursors which are without cross-linking functions, uncured cross-linking polymer precursors and cured cross-linking polymers including cross-linking polymers/precursors having a condensable group containing silicon as a cross-linking function.

The coating oligomer skeleton or a capping group may if desired be rendered capable of reacting with cross-linkable matrix polymer/precursors. For example where a cross-linkable matrix polymer contains olefinic unsaturation the coating oligomer may also contain unsaturation in its skeleton or capping groups, preferably olefinic unsaturation, capable of free-radical cross-linking, or sulphur cross-linking on the addition of sulphur.

Alternatively or additionally, the coating oligomer or matrix polymer may contain reactive sulphur atoms which are capable of forming polysulphide coating-matrix bridges.

Sulphur-curable rubber matrices are of interest among polymers of this type.

Generally, the versatility of the coating oligomer increases with the variety of binding groups. However, it appears preferred that the oligomer does not contain acidic or basic substituents, since these tend to contain undesirable active hydrogen atoms.

Accordingly in one embodiment of its third aspect, the present invention provides an oligomer component of the coating composition (all as hereinbefore defined) which also comprises a cross-linking function.

The coating oligomers of the present invention may be prepared by a process provided by the third aspect of the present invention, comprising capping the hydroxyl groups in an organic oligomer containing at least one hydroxyl group and a plurality of non-hydroxylic oxy groups per molecule, such that less than 15% of the oxy groups in the product are in hydroxyl groups.

Typically, more than 50% of the hydroxyl groups in the hydroxylic precursor of the organic oligomer must be converted into non-hydroxylic oxy groups.

The capping may favorably be carried out on the hydroxylic starting material in situ on the surface of the filler to be coated (so that it forms part of the filler coating process of the fifth aspect of the present invention), or ex situ.

In either case the capping reaction generally comprises reacting the hydroxylic starting material with a capping agent of general formula XQ, where X is the desired capping group and Q is a group capable of ready nucleophilic displacement, or XQ is capable of readily adding across an OH bond.

Thus, when the capping group X is hydrocarbyl, Q may be halide, labile hydrocarbyloxy, or labile acyloxy. When X is a silicon-containing group, Q is conveniently labile hydrocarbyloxy such as alkoxy. For example, an alkyldi-$C_{1-4}$ alkoxysilyl group X may be introduced using an alkyltri-$C_{1-4}$ alkoxysilane. Where the desired capping group is substituted carbamyl, XQ is conveniently an organic isocyanate so that X is RN= where R is the substituent (e.g. aryl) and Q is =C=O. In all cases, the relevant reaction conditions are conventional, and the starting materials are known or are readily and routinely derivable from, or preparable analogously to, known materials.

For example, where the capping group is a condensable silicon-containing group, the hydroxylic starting material and a corresponding substituted silicone having a labile alkoxy group may be mixed to react in solution and/or suspension in water at ambient temperature, and the product worked up conventionally. To prepare the preferred oligomers of the invention in which essentially all the hydroxyl groups are capped, it is desirable that an excess of the capping agent over stoichiometric is used, typically up to a five-fold excess.

In general, it is believed, most conventional matrix polymers/precursors mentioned herein may be used as additional coating composition components, if desired, as well as of any filled matrix and/or a precursor thereof.

The composition may also contain a conventional antioxidant, suitably as up to 5 weight % of the coating composition, and may also contain other conventional additives, such as lubricants, e.g. stearates. The last-named may suitably be present as up to 80 weight % of the composition. Where the coating composition contains a sulphur-curable coating oligomer (e.g. of a type intended to link to a matrix polymer), a sulphur containing vulcanizing agent may also be added to the coating composition for polysulphide linking within or between the coating and/or the matrix or any precursor thereof during and/or after the present coating process, and may be present as up to 5 weight % of the coating composition.

In the fourth aspect the invention provides a particulate filler coated at least in part with a coating composition of the first aspect of the present invention.

The coated fillers of the present invention have some of the properties of the filler particles from which they are derived, and in addition have high compatibility with organic polymers. The products also have the valuable property of being very much more readily mixed with an organic polymer than does the unmodified filler.

Any particulate filler may be used in the present invention provided that the filler is stable in the coated end product, either as such or incorporated in a matrix polymer or a precursor thereof, and under any processing conditions, in particular under any filler heating or coating, or matrix formation, conditions; it is however preferred that the filler is capable of binding to or adsorbing the coating oligomer. The filler should of course desirable be insoluble in water.

The filler may e.g. be amphoteric, e.g. a carbon black, or such an oxide. Suitable such fillers include oxides of aluminum, including hydrated alumina. Such fillers may be of natural or synthetic origin.

The filler may be basic, in particular when any oligomer capping group is a silicon-containing or hydrocarbyl group, such as an oxide, a hydroxide, a carbonate or a basic carbonate. Suitable fillers include oxides, hydroxides, carbonates and basic carbonates of alkaline earth metals and of zinc, and especially carbonates. Preferred carbonates are the carbonates of calcium and magnesium, especially calcium carbonate. Other suitable fillers include basic magnesium carbonate and magnesium hydroxide. Such filler particles may be of natural or synthetic origin. For example, calcium carbonate may be in the form of ground chalk or in the form of a precipitated calcium carbonate, for example calcium carbonate prepared by carbonation of milk of lime. Coated fillers derived from the last named have very good compatibility with organic polymer compositions, in particular fluid e.g. sealant compositions.

The filler may be siliceous. Suitable siliceous materials may be natural or synthetic. Suitable siliceous filler particles may consist of substantially pure silica e.g. sands, quartzes or cristobalites or may contain silica together with a proportion of one or more other metal oxides, for example acidic oxides, e.g. titania, or metal oxides capable of forming silicates, e.g. calcium, magnesium, aluminum and combinations of these. They may consist of a silicate, provided the silicate is one which is suitable for use as a filler, for example if it is insoluble in water. Suitable silicates include clays and talcs, which can be produced in a sufficiently finely divided form to serve as fillers.

The filler may comprise a silicate, for example it may be a silicate coated alkaline earth metal carbonate as described in U.S. Pat. No. 4,374,178.

We prefer that the siliceous particles contain free silanol groups at their surface, either by virtue of their constitution or by modification during manufacture of the material into particles of desired dimensions. We therefore prefer that the siliceous particles consist predominantly of silica and we especially prefer that they consist of substantially pure silica itself. A very suitable material is that known as precipitated silica, which may be made for example by precipitating silica from aqueous solutions of alkali metal silicates by acidification. If desired, other forms of silica may be used, for example that made during burning silicon tetrachloride in air (commonly described as "fumed silica").

Mixtures of all the foregoing particulate fillers may be used.

The filler particles for use in our invention may have any form suitable for a filler, and may have a wide variety of particle shapes and sizes. For example, they may (most commonly) be of substantially spherical shape, though they may if desired be of fibrillar or laminar form.

Most commonly the filler particles will have a size in the range 10 Angstrom to 1 mm, though we prefer, on account of the good reinforcing effect, that the particle size is in the range 40 Angstrom to 2000 Angstrom, for example 75 to 1000 Angstrom. Typically the particles will have a specific surface area of 0.1 to 250 m$^2$g-1, preferably 15 to 75 m$^2$g-1, in particular 20 to 25 m$^2$g-1.

Most conveniently the basic particulate filler is in the form of a finely divided, free flowing powder, and this is the form in which such fillers are usually available in commerce.

The coated fillers of the present invention have many of the properties of the filler particles from which they are derived and good compatibility with organic polymers. Thus the coated filler products are also finely divided, free-flowing powders, and this together with their high compatibility means that they have the valuable property of being more readily mixed with an organic polymer than does the uncoated filler.

The filler may be dried, for example by heat, before use in the products of this invention, in order to drive off all or part of any adsorbed water.

The proportion of coating to filler in the coated filler of the invention may vary, but is often in the range of 0.2 to 20 parts by weight of coating composition per 100 parts by weight of filler, that is, the coating is about 0.2 to 17 weight % of the coated filler. Favored coating proportions are in the range of 1 to 8 parts by weight per 100 parts filler (about 1 to 20 weight %). Within this range, varying proportions be preferred for different filler sizes and materials. However, optimization of the proportions for desired physical properties of the coated filler is a matter of routine trial for the skilled man (e.g. for the production of a free-flowing powder).

In many applications, e.g. in fluid matrices, such as uncured sealants, the filler need not be fully coated. Partially coated particles may be only, for example, at least 20%, for example at least 75%, coated.

In a fifth aspect the present invention provides a process for the production of a coated particulate filler of the invention, which process comprises intimately mixing the filler with (a) a coating composition of the present invention, or
(b) a precursor of the coating composition of the present invention which comprises a hydroxylic precursor of the coating oligomer of the present invention, and simultaneously or subsequently with sufficient of a capping agent for capping the hydroxyl groups in said hydroxylic precursor to give a coating oligomer of the second aspect of the present invention within the coated filler.

Variant (b) is preferred where the capped hydroxyl groups may be formed using a reactive capping agent, e.g. a substituted silane or an isocyanate. Variant (a) is preferred where the corresponding capping agent is relatively inert, e.g. one of those for an alkyl capping group.

Typically, in variant (b) more than 50% of the hydroxyl groups in the hydroxylic precursor of the organic oligomer must be converted into non-hydroxylic oxy groups.

The optimization of the non-extreme coating conditions is a matter of routine trial but the following gives an indication of suitable parameters for the mixing of the filler and the coating composition or the precursor(s) thereof.

The mode of mixing of the components may need to be adapted to suit the particular components used; for example a high-shear blender or ball mill may be most suitable, and it may be helpful to apply some heat. Suitable reaction temperatures may vary over a wide range below that which is deleterious to any component, but will typically be in the range of 15° to 200° C., for example ambient. The application of heat may be desirable both for ease of application of fluid coating compositions (the viscosity of which generally decreases usefully with rising temperature) and, as may be desired, to promote any linking reactions (described elsewhere herein).

Process times are typically in the range 1 minute to 6 hours. Ambient pressure is suitable.

In general in both variants of the coating process of the present invention, regardless of the specific filler or coating composition, it is preferred that the coating composition is a fluid under the coating conditions, and in particular that it is a fluid suspension, dispersion or solution. Especially suitable in the process is the use of a vehicle such as water or an organic solvent or dispersant to assist the spread of the coating or its precursors over the filler, even when the coating composition itself is a fluid e.g. a liquid, and especially e.g. when the coating is to be a low weight proportion of the filler coated therewith or when the coating composition is not fluid itself at the application temperature.

The vehicle should be chemically inert towards the coating oligomer/composition or its precursor and the filler (and vice versa) and it is especially desirable that the vehicle should be inert towards the filler so that it is not preferentially adsorbed thereon to an extent which appreciable diminishes the affinity of the organic oligomer or its precursor for the surface of the filler particles, and, in particular, that the coating oligomer/composition or its precursors in process variant (b) (i.e. the hydroxylic precursor and/or the capping agent) should not contain any functions which may react with the vehicle, e.g. water, under the process conditions. The preferred polyalkylene oxide and polyalkoxylated alcohol and hydroxyarene oligomers and precursors of the present invention are especially suited to the use of an aqueous vehicle in this respect.

Examples of organic vehicles include hydrocarbons, fir example aliphatic, aromatic, araliphatic or cyclo-aliphatic hydrocarbons, e.g. toluene, xylene and petroleum fractions; halogenated and especially chlorinated hydrocarbons, for example merthylene chloride, chloroform, carbon tetrachloride, 1,2-dichloroethane, trichloroethylene and tetrachloroethylene; ethers, for example diethyl ether; and mixtures thereof; all optionally with added water. The choice of solvent will be guided by such factors as low flammability, low toxicity, inertness, and boiling point, which may be significant both in use and in the removal of the solvent from the treated particulate filler.

The proportion of vehicle should ideally be sufficient to disperse the coating composition (as incomplete dispersion may result in undesirable local concentration of composition), and be sufficient to produce a fluid which can readily flow and mix with the filler particles. Suitable proportions can be determined by simple routine trial and are not necessarily critical.

It is also important that the amount of vehicle containing the composition which is used should be sufficient to cover the surface of the filler particles as thoroughly as possible if the most useful fillers are to result.

Conveniently an excess of vehicle sufficient to produce a thoroughly wetted mixture may be used.

With the application of heat as necessary, a range of compositions of the present invention or precursors thereof may be applied as fluids to a wide variety of fillers in this process of the present invention. The process is particularly suitable for the application of a composition comprising an oligomer derived from the reaction of an alkylene oxide with itself and/or with an alcohol, in solution and/or dispersion in water as a vehicle.

It will in general be necessary to remove the vehicle from the coated product filler particles. Thus, the coated particulate filler may be separated from the coating composition and vehicle and heat may preferably and advantageously be applied to remove any residual vehicle. (The vapor pressure characteristics and/or boiling point of the vehicle may thus be significant in the coating process).

The coating may be carried out in the presence of protecting agents, e.g. antioxidants, and/or in an inert atmosphere, e.g. nitrogen, argon or solvent vapor, if it is desired to guard against deterioration of the components during any heating that may be necessary.

In respect of process variant (a) the production of the capped coating oligomer of the present invention has been fully described hereinbefore.

In process variant (b), the filler, coated with a precursor of the coating composition of the invention, may be i) collected, dried and milled and then ii) treated with a capping agent as described hereinbefore for the production of the coating oligomer of the present invention, especially where the capping agent reacts undesirably with any vehicle, e.g. water. Alternatively, stage i) may be omitted, and coating and capping carried out in a one pot process, provided there is no incompatibility between any coating vehicle and any capping agent (e.g. between water and an isocyanate). This one pot process is particularly suitable for the use of a capping agent which contains $C_{1-4}$ alkoxy directly bonded to silicon in an aqueous vehicle.

When the organic oligomer in the coating composition has been applied to the surface of the filler particles in either variant, the resulting product may be in a form in which it can be used directly as a filler or it may need to be treated mechanically, e.g. by grinding, to break up agglomerates and reduce the filler to a suitably small particle size. This is not essential in all cases, however, as any necessary breakdown of the agglomerates may take place satisfactorily while the filler is being incorporated into a polymer matrix, for example by milling.

In the sixth aspect the invention provides a filled cohesive polymer matrix composition comprising a matrix organic polymer and a coated filler of the invention.

The matrix polymer or each polymer in a matrix polymer mixture may be of widely varying constitution, and may be any polymer known in the art to be compatible with a filler. Subject to this proviso, it may be a thermosetting polymer or a thermoplastic. It may be a homopolymer or any type of copolymer (e.g. random, block or graft). It may be cross-linked or not, and may be formed from a precursor which itself contains or does not contain cross-linking functions.

The matrix polymer composition may be a fluid, such as a sealant, or a solid.

As mentioned hereinbefore the matrix polymer may be one of those without cross-linking functions, for example olefin-, vinyl- or acrylic-based polymers, such as homo- and co-polymers of ethylene, propylene, styrene, and vinyl halides, esters and alcohols; or polycondensates, for example those with amide linkages, such as polyamides, polyurethanes and polyureas, with oxy linkages such as polyethers and polysiloxanes, or with polysulphide linkages such as thiokol rubbers. Fluid polysiloxane and polyurethane polymer compositions and polyvinyl chloride plastisol compositions and their precursors are of particular interest.

The matrix polymer may be one with olefinic cross-linking functions, for example 1,3-diene-based rubbers, such as homo- and copolymers of butadiene, isoprene and haloprenes, and their copolymers with olefinics.

The matrix filler-polymer proportion may vary, but is often in the range of 0.4 to 300 parts by weight of coated filler per 100 parts by weight of matrix polymer, that is, the filler is about 0.4 to 75 weight % of the filled matrix. Favored proportions are in the range of 2 to 200 parts by weight (about 2 to 65 weight %). Within this range, proportions in the ranges 2 to 10, 10 to 40 and 40 to 200 parts by weight (about 2 to 10, 10 to 30 and 30 to 65 weight %) may be preferred for different filler and matrix materials e.g. the last named range is preferred for sealant matrices. However, optimization of the proportions for desired physical properties of the filled polymer matrix is a matter of routine trial for each type of matrix polymer.

The matrix composition may also contain a conventional anti-oxidant, suitably up to 5 weight % of the matrix, and other conventional additives, for example plasticizers, vulcanization accelerators, pigments, antiozonants, and fillers other than those of the present invention, and of course in the case of fluid matrices conventional vehicles e.g. for forming dispersions or plastisols of the matrix polymer.

Unsaturation and/or condensable cross-linking functions in the foregoing coating oligomers/matrix polymers tend to make any matrix composition containing such as materials a matrix curable to, and therefore a precursor of, another matrix of the present invention. Such precursor matrix compositions form one embodiment of the sixth aspect of the present invention. Thus, for example, both a fluid sealant and the final polymer matrix to which it cures in use are matrix compositions of the sixth aspect of the present invention.

In the seventh aspect the present invention provides a process for the production of a cohesive filled polymer matrix composition which process comprises intimately mixing the matrix polymer or a precursor thereof with a coated filler of the present invention, and thereafter as necessary converting the mixture to a filled polymer matrix composition.

The mixing step of the process may be carried out by conventionally blending the polymer or the precursor with the filler and other composition components, for example using a planetary vacuum mixer, ball-mill, multi-roll mill or high-shear mixer. Process conditions are generally similar to those described hereinbefore for the coating process of the fifth aspect of the present invention. In the general process of the seventh aspect of the present invention, the product filler will often be coated with a precursor of another matrix composition to form a desired article of commerce, e.g. a fluid sealant. In other cases it is the cured matrix which is desired, and it will be necessary to covert the precursor to the desired final composition. The subsequent conversion step as necessary may be effected conventionally, for example by heating to set a thermosetting matrix polymer or its precursor, or by heating, processing and cooling for a thermoplastic.

Matrix cross-linking, matrix-coating linking coating cross-linking, and or coating-filler linking, reactions may be incorporated in either or both steps. Cross-linking or linking reactions may involve the matrix polymer(s) or precursor(s), the coating oligomer of the invention, and any other polymer in the coating.

In an eighth aspect, the present invention also provides an alternative process for the production of a filled cohesive polymer matrix composition which process comprises intimately mixing the matrix polymer or a precursor thereof with a filler and a coating composition of the present invention, and thereafter as necessary converting the mixture to a filled polymer matrix composition.

Not all of the coating polymer of the present invention may coat the filler, and coating in this process may be hampered, and this alternative process is in general very much less preferred than the matrix composition production process described. It may be desirable to use an excess of coating polymer/composition over that used to coat the filler alone.

This process is otherwise conventional and may be effected essentially as described for the other process of the invention for producing a filled polymer matrix composition.

In a ninth aspect the present invention provides the use of a coating composition of the first aspect of the present invention as a dispersant for a filler in an organic polymer matrix composition or a precursor thereof.

The preparation of coating compositions and coated fillers and precursors thereof and filled polymer matrix compositions of the present invention is illustrated by the following Examples.

EXAMPLE 1

Preparation of Uncoated Filler Suspension

Carbon dioxide (300 liters/hr) and air (450 liters/hr) were passed through 7 liters of milk of lime containing 133.2 g Ca(OH)2 per liter until the pH of the suspension had reached pH 10.0. The suspension was then aged by stopping the CO2 flow, maintaining the air flow and heating the suspension until 85° C. was reached after 15 minutes. The temperature of the suspension was then maintained at 85° C. for 10 minutes and then CO2 (30 liters/hr) finally passed through the suspension until the pH of the resultant calcium carbonate suspension had reached 7.0.

EXAMPLE 2

Preparation of Coated Filler Precursor A—Coated With Uncapped Coating Precursor

The filler suspension of Example 1 was mixed with a dispersion (solution and/or suspension) in 200 ml water of 25.2 g of commercial ethoxylated alcohol (I) (Syperonic A3 from ICI), comprising mainly polyethoxylated $C_{13}$ and $C_{15}$ alcohols with an average ethylene oxide chain length of 3 ($C_2H_4O$) units.

The mixture was then filtered and dried at 110° C. for 16 hours before milling in a laboratory pin mill. (The final product was confirmed to contain a 2.0% coating of (I) by gravimetric analysis after dissolution of the calcium carbonate in HCl).

EXAMPLE 3

Preparation of Coated Filler B From Precursor A—In Situ Capping 600 g of dried filler A were slurried with 2000 ml of water and 6 g of methyltriethoxy silane for 5 minutes at 2000 rpm agitator speed. The filler was then filtered and dried for 16 hours at 110° C. before pin-milling.

EXAMPLE 4

Preparation of Coated Fillers C and D From Uncoated Filler—In Situ Capping, One-Pot Process A 7 liter portion of the Example 1 suspension of calcium carbonate was mixed with a solution of 25.2 g of (I) in 200 ml of water. To one portion of 3.5 liters was added 6.3 g of methyltriethoxy silane (Filler C) and to the other 3.5 liter portion was added 6.3 g vinyltrimethoxy silane (Filler D). In both cases mixing was carried out for 10 minutes before filtration, drying 16 hr at 110° C. and pin-milling to complete filler production. For filler C the (I): silane molar ratio is 1:1 with the g. equiv. ratio for OH:Si=1.53:1.

EXAMPLE 5

Preparation of Uncoated Filler

A silicate-coated calcium carbonate filler is prepared by the methods of U.S. Pat. No. 4,374,178.

EXAMPLE 6

Preparation of Coated Fillers E and F In Situ Capping, One-Pot Process

The filler of Example 5 is coated as in Example 4 to give fillers E and F respectively.

EXAMPLE 7

Preparation of Coated Filler G—Coating With Capped Oligomer

A capped oligomer was prepared by adding 25.2 g of synperonic A3 (25.2 g) and 12.6 g of methyltriethoxysilane (Union Carbide A162) to 400 ml of water, and heating the mixture at 85° C. for 25 min. The product dispersion was then added to and slurried with a 7 1 portion of the Example 1 suspension of calcium carbonate. Work up of the slurry as in Example 4 gave the desired coated filler G.

EXAMPLE 8

Preparation of Coated Fillers H to L—Coating With Capped Oligomer

The following quantities of a methyl capped polyethoxylate (Ukanil 190, ICI) in 400 ml of water were used as in Example 7 to produce coated fillers H to L.
filler H 6.3 g (0.5 wt % of the coated filler)
filler I 12.6 g (1.0 wt % of the coated filler)
filler J 19.0 g (1.5 wt % of the coated filler)
filler K 25.3 g (2.0 wt % of the coated filler)
filler L 37.5 g (3.0 wt % of the coated filler)

EXAMPLE 9

Preparation of Coated Filler M—Coating With Composition Containing Capped Oligomer 24.7 g of commercial grade stearic acid (containing a range of long chain fatty acids including palmitic acid c. 40% and oleic acid <5%) and 24 g of aqueous ammonia in 400 ml of water were added to a calcium carbonate suspension as in Example 7, followed by the addition of 8.2 g Ukanil 190 in 400 ml of water and 25 min further mixing of the resultant slurry. Work up of the slurry as in Example 4 gave the desired coated filler M (stearate 1.95 wt %, Ukanil 190 0.65 wt %, of the coated filler).

EXAMPLE 10

Preparation of Coated Filler N—Coated With Composition Containing Capped Oligomer The process of Example 9 was repeated using 16.45 g stearic acid and 16 g aqueous ammonia in 200 ml of water and 16.45 g of Ukanil 190 in 200 ml of water to give coated filler N (stearate 1.3 wt %, Ukanil 190 1.3 wt %, of the coated filler).

EXAMPLE 11

Preparation of Coated Filler O—Coating With Composition Containing Capped Oligomer The process of Example 9 was repeated using 8.2 g stearic acid, and 8 g aqueous ammonia, and 24.7 g of Ukanil 190 to give coated filler O (stearate 0.65 wt %, Ukanil 190 1.95 wt %, of the coated filler).

EXAMPLE 12

Preparation of Filled Polymer Matrices

The fillers B to G and K were compounded into the following silicone sealant formulation using a laboratory scale planetary vacuum mixer.

| | | |
|---|---|---|
| Hydroxy-terminated polysiloxane polymer | 384 g | Premixed 20 mins |
| Polysiloxane fluid | 164.5 g | |
| Filler | 300 g | Added progressively with vacuum mixing between each addition |
| Methyltriethoxysilane | 22.9 g | Mixed in order at atmospheric pressure for 10 mins between additions and final 5 min mixing |
| Aminosilane adhesion promoter | 10.0 g | |
| Titanium chelating compound | 20.6 g | |

Each product was immediately dispensed to plastic 310 ml cartridges, and tested as set out in Example 14, and found to have good relevant physical properties.

The fillers H to J and L to O are similarly compounded into an analogous silicone sealant formulation.

EXAMPLE 13

Preparation of Filled Polymer Matrices

The fillers B to G and K were compounded into the following silicone sealant formulation using a laboratory scale planetary vacuum mixer.

| | | |
|---|---|---|
| Hydroxy terminated polysiloxane polymer | 600 g | premixed 10 min |
| Methyl terminated polysiloxane fluid | 300 g | |
| Oxime cross-linking silane (EP 6567, ICI) | 60 g | added, mixed 15 min |
| Titanium dioxide | 25 g | mixed in order at atmospheric pressure for 10 min each and final 5 min mixing |
| Filler | 500 g | |
| Dibutyl tin dilaurate | 0.75 g | |

The product was dispensed as in Example 12.

The fillers H to J and L to O similarly compounded into an analogous silicone sealant formulation.

EXAMPLE 14

Physical Properties

The following tests were carried out on the sealants of Examples 12 and 13:

Slump testing was carried out in a Boeing JIG at 25° C. for 5 minutes 24 hours after compounding.

Extrudability was measured 24 hours after compounding by timing the flow of 20 g sealant through a 6 mm diameter orifice at 36 psi pressure.

Tensile testing: H pieces 12×12×50 mm were prepared with glass plates 24 hours after compounding according to BS 5889: 1980 and tested 28 days later on an Instron tensometer for 100% modulus, tensile strength at break and % elongation to break.

Tear strength and hardness were measured on 3 mm and 6 mm thick sheets respectively cast 24 hours after manufacture and tested 28 days later by tensometer and Shore A durometer (4 second reading) respectively.

Measurements of yield stress value (YV) and viscosity under shear at 260 sec-1 (n) were made with a contraves Rheomat concentric cylinder viscometer with a speed program from zero to 260 sec-1 over 160 seconds, followed by 600 seconds at 260 sec-1 and then 260 to 0 sec-1 over a further 160 seconds. The rheological parameter R may be calculated by taking the ratio YV/n, a larger value being preferred normally to minimize viscosity after shear thinning and maximize the yield value, and therefore anti-slump property.

The results shown in the following Tables were amongst those obtained. Additionally, the matrices were found to have good R values.

TABLE 1

| | TENSILE PROPERTIES | | | | | |
|---|---|---|---|---|---|---|
| FILLER | 100% Modulus MPa | Tensile Modulus MPa | % Elongation to Break | Tear Strength Nmm$^{-1}$ | Slump mm | Extrudability sec/20 g |
| FILLER PERFORMANCE IN SILICONE SEALANT AND MATRICES OF EXAMPLE 12 | | | | | | |
| B | 0.25 | 0.83 | 450 | 7.9 | 22 | 4.0 |
| C | 0.27 | 0.97 | 490 | 8.4 | 8 | 3.5 |
| D | 0.28 | 1.01 | 460 | 5.3 | 27 | 4.0 |
| E | 0.27 | 0.92 | 630 | 8.5 | 65 | 3.0 |
| F | 0.35 | 1.02 | 370 | 6.2 | 32 | 4.0 |
| G | 0.21 | 0.66 | 494 | 6.3 | | 5.0 |
| FILLER PERFORMANCE IN SILICONE SEALANT AND MATRICES OF EXAMPLE 13 | | | | | | |
| D | 0.41 | 0.94 | 261 | 5.9 | | 8.5 |
| G | 0.39 | 1.01 | 303 | 5.5 | | 4.5 |

TABLE 1-continued

| FILLER | TENSILE PROPERTIES | | % Elongation to Break | Tear Strength Nmm$^{-1}$ | Slump mm | Extrudability sec/20 g |
| --- | --- | --- | --- | --- | --- | --- |
| | 100% Modulus MPa | Tensile Modulus MPa | | | | |
| K | 0.41 | 0.91 | 315 | 4.9 | | 8.0 |

We claim:

1. A filled cohesive polymer matrix comprising an organic matrix polymer and a particulate filler which is coated at least in part with a coating composition comprising an organic oligomer containing a plurality of oxy groups, including hydroxyl groups of which at least 50% are capped so that less than 15% of the oligomer oxy groups are comprised in hydroxyl groups.

2. A fluid polymer matrix according to claim 1, comprising a polysiloxane or polyurethane matrix polymer.

3. A polymer matrix according to claim 1 wherein the filler is a carbon black, an amphoteric oxide, a oxide, hydroxide or carbonate which is basic or a basic carbonate, silica or a silicate, with a mean particle size in the range of 75 to 1000 Angstrom.

4. A polymer matrix according to claim 1, wherein the filler is a particulate amphoteric, basic or siliceous inorganic filler with a mean particle size in the range of 40 to 2000 Angstrom.

5. A process for the preparation of a polymer matrix composition according to claim 2, which process comprises intimately mixing a matrix polymer or a precursor thereof with a coated filler according to claim 3, and thereafter as necessary converting the mixture to a filled polymer matrix composition.

6. A polymer matrix according to claim 1, wherein the organic oligomer is a derivative of a polyalkylene oxide or a polyalkoxylated alcohol or hydroxyarene.

7. A polymer matrix according to claim 1, wherein the oligomer is of number average molecular weight 200 to 500, and having 2 to 12 oxy groups per molecule.

8. A polymer matrix according to claim 1, wherein the oligomer is a derivative of a polyethoxylated $C_{10-20}$ fatty alcohol and contains a plurality of oxy groups, less than 15% of which are comprised in hydroxy groups.

9. A polymer matrix according to claim 1, wherein the oligomer is a polyethoxylated or propoxylated $C_{10-20}$ fatty alcohol in which the hydroxyl groups are capped so that less than 15% of the oligomer oxy groups are comprised in hydroxyl groups.

10. A polymer matrix according to claim 1, wherein the oligomer is an ethoxylated alcohol in which at least 50% of the hydroxyl groups are capped.

11. A polymer matrix according to claim 9 wherein said ethoxylated alcohol is comprised mainly of $C_{13}$ and $C_{15}$ alcohols with an average ethylene oxide chain length of 3 ($C_2H_4O$) units.

12. A polymer matrix according to claim 9 which contains a capping agent.

13. A polymer matrix according to claim 12 wherein said capping agent has a silicon-containing group.

* * * * *